United States Patent [19]

Keller

[11] Patent Number: 4,534,578
[45] Date of Patent: Aug. 13, 1985

[54] MUSCLE DRIVEN, SINGLE TRACK BICYCLE

[76] Inventor: Roland Keller, Hauptstrasse 68, 8592 Uttwil, Switzerland

[21] Appl. No.: 442,781

[22] Filed: Nov. 18, 1982

[30] Foreign Application Priority Data

Nov. 18, 1981 [CH] Switzerland .......................... 7412/81

[51] Int. Cl.³ .............................................. B62K 19/16
[52] U.S. Cl. ............................. 280/281 R; 280/281 B; 296/78.1
[58] Field of Search .......... 280/281 R, 281 LP, 281 B, 280/274, 1.11 R; D12/110, 111, 112; 296/78.1

[56] References Cited

U.S. PATENT DOCUMENTS

| | | | |
|---|---|---|---|
| D. 163,899 | 7/1951 | Piatti | D12/110 |
| 2,370,726 | 3/1945 | Hess et al. | 280/281 R |
| 2,755,873 | 7/1956 | Klaue | 280/281 R X |
| 2,854,249 | 9/1958 | Jaulmes | 280/281 R |
| 3,375,024 | 3/1968 | Bowden | 280/281 R |
| 3,787,088 | 1/1974 | Dreyer, Sr. | 280/281 R X |
| 4,230,332 | 10/1980 | Porsche | 280/281 B |
| 4,361,338 | 11/1982 | Kuchenbecker et al. | 280/1.11 R |

FOREIGN PATENT DOCUMENTS

| | | | |
|---|---|---|---|
| 544920 | 7/1922 | France | 280/281 R |
| 616521 | 2/1961 | Italy | 280/281 R |
| 241567 | 7/1946 | Switzerland . | |
| 194801 | 3/1923 | United Kingdom | 280/281 R |
| 484893 | 5/1938 | United Kingdom | 280/281 R |
| 1361394 | 7/1974 | United Kingdom | 280/281 R |
| 2085385 | 4/1982 | United Kingdom | 280/281 R |

Primary Examiner—Joseph F. Peters, Jr.
Assistant Examiner—Mitchell J. Hill
Attorney, Agent, or Firm—Ladas & Parry

[57] ABSTRACT

A bicycle comprises a frame made of a plastic material or aluminium, which frame comprises a structural center section and two bracing members located externally relative to a vertical plane each defined by the laterally outermost point of each foot pedal. The frame is in form of a hollow case and comprises a forward closed hollow case member, in which a handlebar stem tube and a foot pedal bearing device are molded and comprises further a rear support structure, in which the rear wheel of the bicycle and a saddle support are mounted. A fairing is provided as integral part of this frame structure increasing the aerodynamic features thereof. The structure of the frame allows together with this fairing to provide a lightweight, twisting resistant structure resistant to bending, too, which is integrable into the fairing.

9 Claims, 6 Drawing Figures

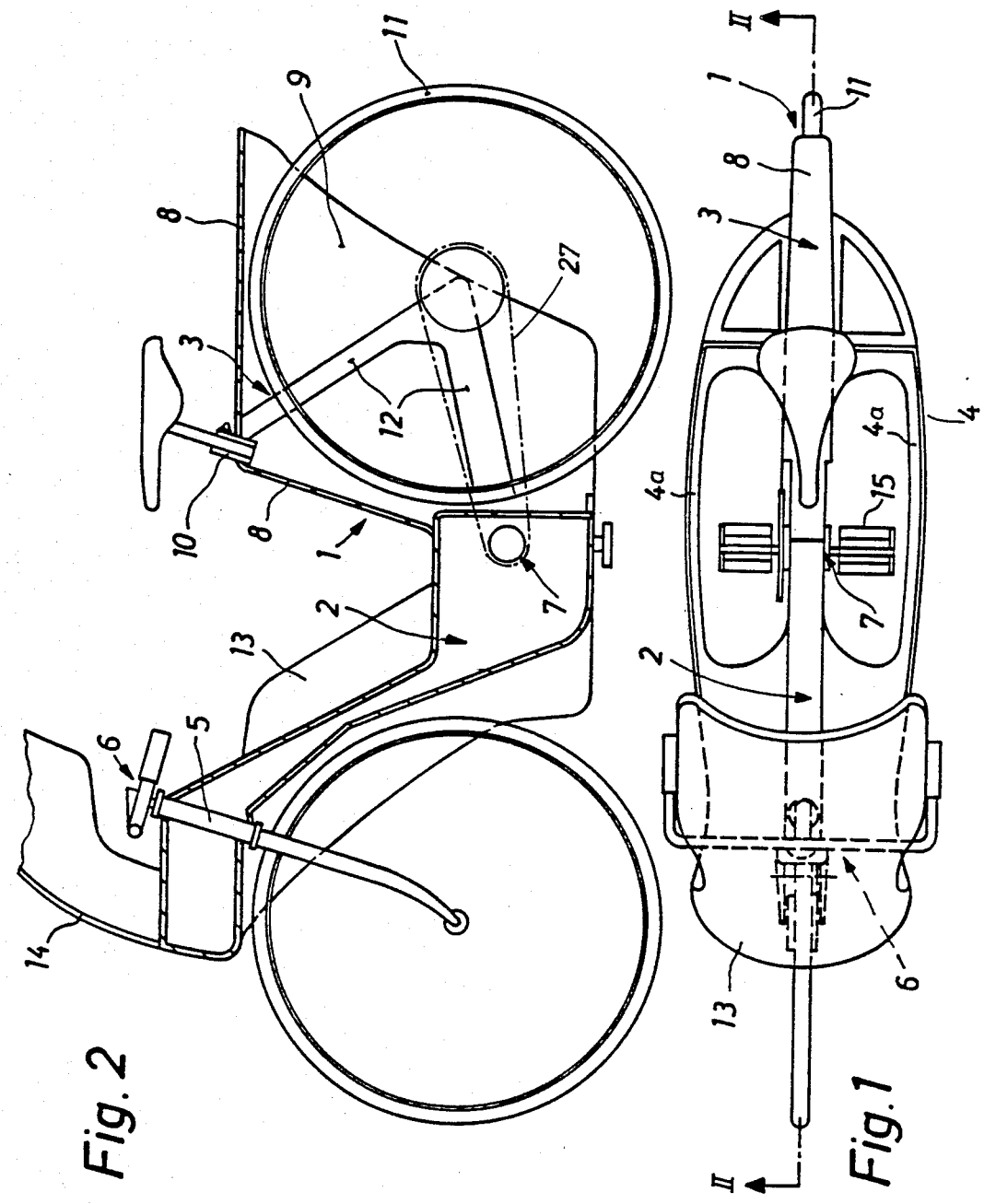

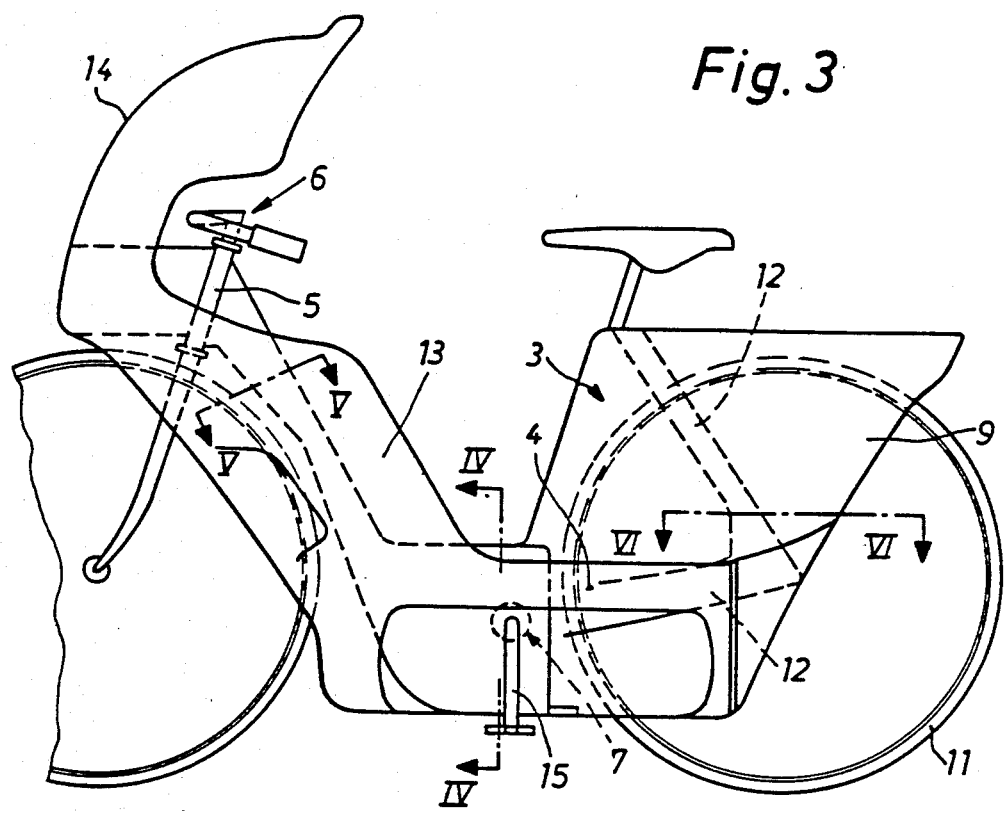
Fig. 3
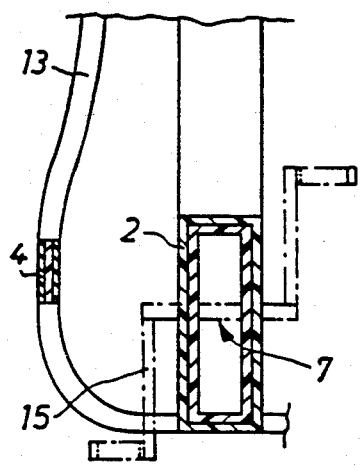
Fig. 4
Fig. 5
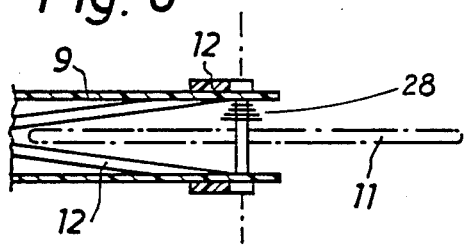
Fig. 6

MUSCLE DRIVEN, SINGLE TRACK BICYCLE

BACKGROUND OF THE INVENTION

1. Field of the Invention

The present invention relates to a muscle driven, single track bicycle having a foot pedal and a frame made of a plastic material or aluminum.

2. Description of the Prior Art

Common bicycles are provided mainly for stability purposes with a frame made of metal tubes. Recently corresponding structures have become available made from extremely strong nonmetallic materials such as carbon fibers. However, both structural designs take hardly aerodynamic facts and protection against exposure into consideration. Furthermore, the known metal frame structure if built as lightweight structure is extremely costly and prone to increased maintenance.

SUMMARY OF THE INVENTION

Hence, it is a general object of the present invention to provide an improved construction of a bicycle which does not incorporate above explained drawbacks and features an excellent mechanical stability in spite of a lightweight design.

Now, it order to implement these and still further objects of the invention, which will become more readily apparent as the description proceeds, the muscle driven, single track bicycle of this development is manifested by the features that the metal frame comprises a structural center section formed of a hollow case; comprises further two bracing members each located externally relative to a vertical plane each defined by the laterally outermost point of each foot pedal and mounted to the structural center section and comprising a fairing.

According to a preferred embodiment the bracing members pass over into a fairing at the front end such to reduce the drag factor of the bicycle.

A further object of the invention is to provide a bicycle having a low drag factor and yet features a torsionally resistant, lightweight frame in spite of the use of plastic material for the manufacture thereof.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is a top view of a preferred embodiment of the bicycle constructed in accordance with the present invention;

FIG. 2 is a view of a section along line II—II of FIG. 1;

FIG. 3 is a side view of the bicycle shown in FIG. 1;

FIG. 4 is a section with parts partly broken away along line IV—IV of FIG. 3;

FIG. 5 is a view of a section taken along line V—V of FIG. 3; and

FIG. 6 is a view of a section taken along line VI—VI of FIG. 3.

DETAILED DESCRIPTION OF THE PREFERRED EMBODIMENT

Describing now the drawings and considering initially the exemplary embodiment of the bicycle such as shown in FIG. 2, it will be understood that the same comprises a bicycle frame having a structural center section in form of a hollow case 1 which is provided at the front end with a hollow case member 2 and a rear support structure 3 mounted thereto. At a location externally relative to a vertical plane defined by the laterally outermost point of each foot pedal a bracing member 4 each is arranged (FIGS. 1, 3). The hollow case member 2, the rear support structure 3 and the bracing members 4 define together with the connecting section 13 a frame which is an integral torsion-proof body of a high bending resistance to which the other structural parts of the bicycle are mounted. A handlebar stem tube 5 which supports the wheel fork 6 as well as a foot pedal bearing 7 (FIG. 4) are molded into the hollow case member 2. The rear support structure 3 which comprises side walls 9 interconnected by means of webs 8 supports a saddle support 10 and is also utilized for the mounting of the rear wheel 11 of the bicycle. The side walls are provided with reinforcing sections 12, which extend on the one hand between the rear wheel mount and the saddle support 10 and on the other hand between the rear wheel mount and the foot pedal bearing 7. These reinforcing sections 12 are formed by several glass fiber reinforced layers or by a honeycomb structure integrated into said side walls, thereby providing for the stability of the rear wheel suspension of the bicycle together with the other portions of the rear support section 3. The hollow case member 2 and the bracing members 4 absorb together with the fairing 13 the forces at the front wheel area of the bicycle. The rear support structure 3 is integral with the hollow case member 2, which two parts are additionally connected to each other via the lateral bracing members 4a. The latter feature establishes an excellent torsional stiffness of the entire structure. At the front area the bracing members 4 pass over into a fairing 13 which is structured aerodynamically such that the drag of the bicycle including the cyclist is reduced, which fairing 13 comprises specifically knee covering sections. A windshield 14 may be located at the general area of vision of the cyclist, which windshield 14 is obviously made from a transparent plastic material. The bracing members 4 are shaped in the general area of the foot pedal 15 as flat strips extending parallel to the plane defined by the pedal members (FIGS. 3, 4), which strips 4 mainly extend in longitudinal and vertical direction, whereas they have a small thickness relative to their lateral extension. They are designed such that enough free space is left in upwards direction and also downwards as well as laterally such that the cyclist will not be detrimentally affected by these bracing members 4 in this area. Upon stopping the cyclist can easily put his feet on the ground outside of the bracing members 4. In the general area of the rear wheel 11 the side walls 9 define simultaneously an aerodynamically advantageous wheel covering and act as mud guard such as is the case at the forward fairing section 13 and accordingly the hitherto known mud guards for bicycles are no longer necessary. Because the hollow case member 2 is structured in the general area of the foot pedal 15 such that it has a low contour, the embodiment can be used by men as well as women, this in contrast to the hitherto two different designs used to this end. The driving structure which is a chain drive 27 acting onto the axis of the rear wheel engaging a sprocket 28 as shown in FIGS. 2 and 6 is of a common well-known design and accordingly will not be described in detail.

The material used for manufacturing the frame is a glass fiber reinforced plastic material or aluminium and in the area of the hollow case member 2 this frame as well as the bracing members is a multilayer construction, a laminate in which an insert of a hard foamed material or a honeycomb structure is utilized such as schematically shown in FIGS. 4 and 5. This so-called sandwich construction allows a maximal stability simultaneous with achieving a minimal weight. Color pigments can be added to an outermost covering layer according to known procedures such that an additional application of lacquer is no longer necessary.

Additional articles, such as a baggage rack, saddle bags, etc., can be formed integrally into the plastic material or aluminium. Specifically, the baggage rack may be part of the rear support structure 3 and function as a web 8.

The described bicycle can be an extremely lightweight construction, may have, for instance, the weight of a present racing bicycle without suffering of the stability. The aerodynamic advantageous shape of the fairing allows specifically at higher speeds a significant reduction of the drag.

While there are shown and described present preferred embodiments of the invention, it is to be distinctly understood that the invention is not limited thereto, but may be otherwise variously embodied and practiced within the scope of the following claims.

Accordingly,

What is claimed is:

1. A muscle driven, single track bicycle comprising a front and a rear wheel, a driving mechanism located between said front and rear wheels including chain driving means and two foot pedals and a frame structure made of plastic and integrated reinforcing elements, said frame structure including a central supporting structure in the form of a hollow case extending substantially between said front and rear wheels said chain driving means being located near said central supporting structure; said frame structure further including an outer bracing structure having a front portion and a rear portion laterally projecting from said central supporting structure and being connected thereto further having two lateral bracing members each extending between said front portion and said rear portion in a plane outside of the respective foot pedal thereby leaving a lateral distance to said central supporting structure and providing vertical openings for the foot pedals, said front portion of the outer bracing structure forming a fairing; said lateral bracing members being connected to said fairing at at least said front portion of said bicycle to reduce any drag factor and torsion associated with said bicycle.

2. The muscle driven, single track bicycle of claim 1, wherein said fairing comprises at least one pair of knee covering sections.

3. The muscle driven, single track bicycle of claim 1, wherein said laterally located bracing members are shaped at the area of said foot pedal as flat strips extending parallel to the plane defined by the foot pedals such to secure the freedom of movement of a cyclist.

4. The muscle driven, single track bicycle of claim 1, wherein said frame is constructed area-wise as a laminate of a glass fiber reinforced plastic material and a hard foam.

5. The muscle driven, single track bicycle of claim 4, wherein said lateral bracing members are laminates.

6. The muscle driven, single track bicycle of claim 1, wherein said frame structure and said fairing, respectively, are shaped such that they form a mud guard.

7. The muscle driven, single track bicycle of claim 1, wherein said hollow case-like central supporting structure comprises a substantially closed hollow case member intended to receive a foot pedal bearing means and a handlebar stem tube as well as a rear support structure mounted thereto and receiving an axis of said rear wheel and saddle support means.

8. The muscle driven, single track bicycle of claim 7, wherein said rear support structure comprises two side walls interconnected by webs, said side walls having reinforcing sections which extend substantially between a mount for said rear wheel axis, said saddle support means and a foot pedal bearing area.

9. The muscle driven, single track bicycle of claim 1, wherein said frame structure and said fairing, respectively, are shaped such that they form a mud guard.

* * * * *